(12) United States Patent
Ross et al.

(10) Patent No.: US 12,242,844 B2
(45) Date of Patent: Mar. 4, 2025

(54) DETERMINING CORRECT BASE IMAGES FOR CUSTOM IMAGES

(71) Applicant: International Business Machines Corporation, Armonk, NY (US)

(72) Inventors: Martin A. Ross, Gosport (GB); Jack Richard William Stevenson, Winchester (GB); Jack William Donato Evans, Rochester (GB); Jake Amies, Norwich (GB)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 18/360,091

(22) Filed: Jul. 27, 2023

(65) Prior Publication Data

US 2025/0036401 A1 Jan. 30, 2025

(51) Int. Cl.
G06F 8/71 (2018.01)
G06F 8/61 (2018.01)

(52) U.S. Cl.
CPC . *G06F 8/71* (2013.01); *G06F 8/63* (2013.01)

(58) Field of Classification Search
None
See application file for complete search history.

(56) References Cited

U.S. PATENT DOCUMENTS

| 10,379,841 B2 * | 8/2019 | Wong ...................... G06F 8/658 |
| 10,719,612 B2 | 7/2020 | Stopel et al. |
| 11,388,180 B2 | 7/2022 | Chen et al. |
| 11,983,525 B2 * | 5/2024 | BenHanokh ............... G06F 8/63 |
| 2020/0082094 A1 * | 3/2020 | Mcallister ................. G06F 8/77 |
| 2021/0382997 A1 * | 12/2021 | Yi .......................... G06F 21/577 |
| 2023/0021416 A1 | 1/2023 | Frackiewicz |

FOREIGN PATENT DOCUMENTS

| CN | 108984165 A | 12/2018 |
| CN | 110688137 A | 1/2020 |

OTHER PUBLICATIONS

"Admission Controllers Reference", Kubernetes, last modified Mar. 20, 2023, accessed Jul. 3, 2023, 14 pages. https://kubernetes.io/docs/reference/access-authn-authz/admission-controllers/.

(Continued)

*Primary Examiner* — Marina Lee
(74) *Attorney, Agent, or Firm* — Yee & Associates, P.C.

(57) ABSTRACT

Determining correct base container images to support custom container images is provided. A comparison between layers of a base container image corresponding to a current version of an operand and layers of a custom container image built by a user is performed using an operator. It is determined whether the user utilized a correct base container image to build the custom container image based on the comparison between the layers of the base container image corresponding to the current version of the operand and the layers of the custom container image built by the user. A runtime is generated in a cluster of host nodes to provide a service based on the custom container image in response to determining that the user utilized the correct base container image to build the custom container image.

20 Claims, 2 Drawing Sheets

(56) References Cited

OTHER PUBLICATIONS

"App Connect Integration Server reference", IBM Corporation, last updated Jun. 28, 2023, accessed Jul. 3, 2023, 6 pages. https://www.ibm.com/docs/en/app-connect/containers_cd?topic=resources-integration-server-reference.

"Create a base image," Docker Documentation, accessed Jul. 27, 2023, 2 pages.https://docs.docker.com/build/building-base-images/.

"Dependabot," GitHub, accessed Jul. 20, 2023, 3 pages.https://github.com/dependabot.

"IBM/portieris: a Kubernetes Admission Controller for verifying image trust with Notary," GitHub, accessed Jul. 20, 2023, 5 pages. https://github.com/IBM/portieris.

"Obtaining the IBM App Connect Enterprise server image from the IBM Cloud Container Registry", IBM Corporation, last updated Jun. 28, 2023, accessed Jul. 3, 2023, 6 pages. https://www.ibm.com/docs/en/app-connect/containers_cd?topic=obtaining-app-connect-enterprise-server-image-from-cloud-container-registry#aceimages.

"Overview of IBM App Connect in containers (Continuous Delivery)," IBM Corporation, last updated Feb. 28, 2023, accessed Jul. 27, 2023, 2 pages.https://www.ibm.com/docs/en/app-connect/containers_cd.

Huang, "Kubernetes admission controllers in 5 minutes", Feb. 18, 2021, accessed Jul. 3, 2023, 9 pages. https://sysdig.com/blog/kubernetes-admission-controllers/#:~:text=Admission%20controllers%20are%20a%20powerful,what's%20going%20into%20your%20cluster.

* cited by examiner

DETERMINING CORRECT BASE IMAGES FOR CUSTOM IMAGES

BACKGROUND

The disclosure relates generally to container orchestration architectures and more specifically to determining correct base container images to support custom container images in a container orchestration architecture.

A container orchestration architecture, platform, environment, or the like, such as, for example, Kubernetes® (a registered trademark of the Linux Foundation of San Francisco, CA, USA), provides a structural design for automating deployment, scaling, and operations of containers across clusters of host nodes. Many cloud services offer a container orchestration architecture as a service (e.g., Platform-as-a-Service or the like). A host node is a machine, either physical or virtual, where containers (i.e., application workloads) are deployed. A container is the lowest level of a micro-service, which holds the running application, libraries, and their dependencies. A container image is a standalone, executable package of software that includes everything needed to run the application (e.g., code, runtime, system tools, system libraries, settings, and the like). The container image becomes the container at runtime. A pod is a group of one or more containers, with shared storage and network resources, and a specification for how to run the containers. A pod's contents are always co-located and co-scheduled and run in a shared context. The host node hosts the pods that are the components of the application workload.

A resource in a container orchestration architecture stores a set of application programming interface (API) objects of a certain kind (e.g., a built-in pod resource contains a set of pod objects). A custom resource enables a user to create API objects. A custom resource allows the user to extend container orchestration architecture capabilities beyond the default installation by adding any kind of API object useful to an application. In other words, a custom resource represents a customization of a particular container orchestration architecture installation. A custom resource definition defines a custom resource. Custom resources can appear and disappear in a running cluster of host nodes through dynamic registration, and cluster administrators can update custom resources independently of the cluster itself.

SUMMARY

According to one illustrative embodiment, a computer-implemented method for determining correct base container images to support custom container images is provided. A computer, using an operator, performs a comparison between layers of a base container image corresponding to a current version of an operand and layers of a custom container image built by a user. The computer determines whether the user utilized a correct base container image to build the custom container image based on the comparison between the layers of the base container image corresponding to the current version of the operand and the layers of the custom container image built by the user. The computer generates a runtime in a cluster of host nodes to provide a service based on the custom container image in response to the computer determining that the user utilized the correct base container image to build the custom container image based on the comparison between the layers of the base container image corresponding to the current version of the operand and the layers of the custom container image built by the user. According to other illustrative embodiments, a computer system and computer program product for determining correct base container images to support custom container images are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
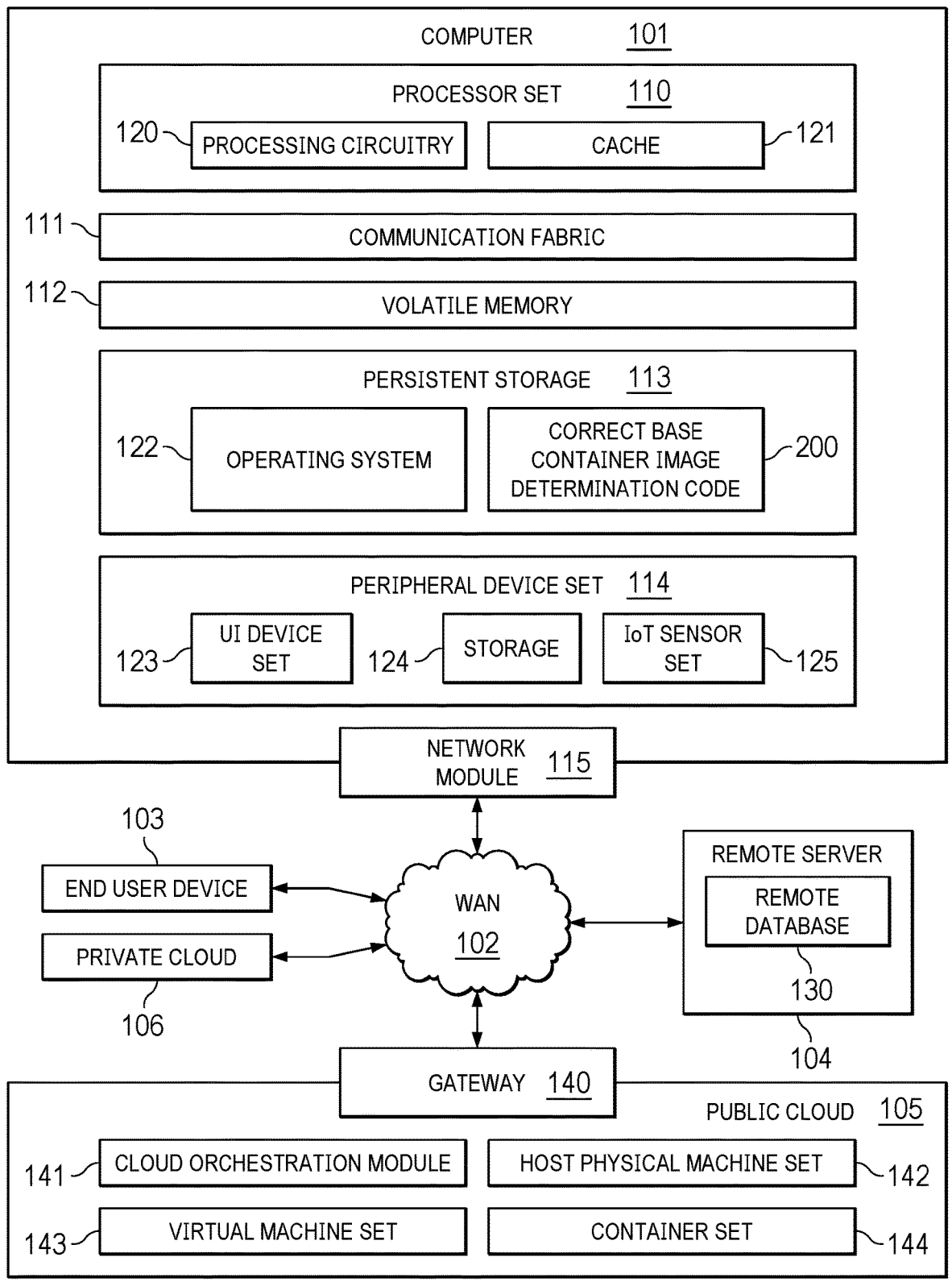
FIG. 1 is a pictorial representation of a computing environment in which illustrative embodiments may be implemented.

With reference now to the figures, and in particular, with reference to FIG. 1, a diagram of a data processing environment is provided in which illustrative embodiments may be implemented. It should be appreciated that FIG. 1 is only meant as an example and is not intended to assert or imply any limitation with regard to the environments in which different embodiments may be implemented. Many modifications to the depicted environment may be made.

FIG. 1 illustrates a pictorial representation of an example computing environment in which illustrative embodiments may be implemented. Computing environment 100 contains an example of an environment, such as a container orchestration architecture, for the execution of at least some of the computer code involved in performing the inventive methods of illustrative embodiments, such as correct base container image determination code 200. For example, correct base container image determination code 200 ensures that referenced or deployed custom container images are valid in their usage by comparing image layers of the custom container images with supported base container images of the container orchestration architecture.

In addition to correct base container image determination code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and correct base container image determination code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, mainframe computer, quantum computer, or any other form of computer or mobile device now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in correct base container image determination code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The correct base container image determination code included in block 200 includes at least some of the computer code involved in performing the inventive methods of illustrative embodiments.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a user of the correct base container image determination service provided by computer 101), and may take any of the forms discussed above in connection with computer 101. EUD 103 typically receives helpful and useful data from the operations of computer 101. For example, in a hypothetical case where computer 101 is designed to provide a correct base container image determination to the end user, this correct base container image determination would typically be communicated from network module 115 of computer 101 through WAN 102 to EUD 103. In this way, EUD 103 can display, or otherwise present, the correct base container image determination to the end user. In some embodiments, EUD 103 may be a client device, such as thin client, heavy client, mainframe computer, desktop computer, laptop computer, tablet computer, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a correct base container image determination based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

When developing container-based applications, most container images start from a parent or base container image. In other words, a user typically creates a custom container image based on a parent or base container image. Each subsequent declaration (e.g., a custom extension) in a container image modifies the parent or base container image. It should be noted that most container images start from a parent container image, rather than a base container image because a base container image is made from scratch and has no parent container image. However, as used herein, the terms "base container image" and "parent container image" can be used interchangeably.

Building custom container images from base container images provides advantages to program developers by enabling common libraries and resources to be included and maintained separate from the application layer (e.g., enabling security fixes to be readily added to container images by making changes in a single place rather than multiple places, enabling program developers to enforce security compliance standards, and supporting custom extensions added to base container images by users).

Typically, container orchestration architectures (e.g., Kubernetes) are built on top of an operator-based framework. In other words, a container orchestration architecture can provide an operator and a number of corresponding operands to run customer application workloads and services. An operator is a construct defined within programming languages that generally behaves like a function. Typically, programming languages define a set of built-in operators, and in some cases allow users to add new meanings to existing operators or even define completely new operators. An operand is an object or data that is operated on by an operator.

Most use cases are supported by base container images built by the program developers and supported by the container orchestration architecture. However, in some use cases a user needs to be allowed to utilize custom container images to support certain features, such as, for example, custom host nodes that have been built using a software development kit, to package certain third-party libraries to be referenced within the message flow logic, or the like.

However, a custom container image needs to be based on an appropriate supported base container image, which corresponds to an operand version specified by the user in a custom resource. The custom resource can be, for example, a YAML file, which includes an identifier (e.g., name) of a base container image corresponding to the operand version. Oftentimes, users build custom container images that are not based on the correct base container image, which leads to errors and customer support tickets. Consequently, users need to know whether the correct base container image is being used to create a custom container image so that, for example, security compliance is adhered to, provenance is known, applications are secure, and the like. As a result, a new solution is needed to provide quick feedback to a user indicating that the user did not utilize an appropriately compatible base container image to build a custom container image based on an operand version specified in the custom resource for the user to fix the issue without having to raise a customer support ticket.

When reconciling an operand, the operator determines whether a custom container image has been specified by the user in the custom resource. When a custom container image has been specified in the custom resource, the operator retrieves information regarding the base container image, which corresponds to the operand version contained in the custom resource, from a container image registry to determine whether a correct base container image has been used to build the customer container image and the user is therefore running in a supported image configuration so that illustrative embodiments can provide immediate feedback to the user (i.e., the user did not use the correct base container image to build the customer container image). As a result, illustrative embodiments provide immediate feedback to the user that an error has been made for the user to rectify the error by utilizing the correct base container image to build the custom container image. Thus, illustrative embodiments decrease customer support tickets. Moreover, illustrative embodiments determine whether each respective custom container image on a managed cluster of host nodes in the container orchestration architecture is based on a correct common base container image to, for example, enforce application security compliance requirements. Therefore, illustrative embodiments increase security of containerized applications running on host nodes in the container orchestration architecture.

Many services corresponding to containerized applications are delivered using a container orchestration architecture, and many of these container orchestration architectures allow users to override the container images that are supported by these container orchestration architectures to allow the users to extend the capabilities or add customizations to these container orchestration architectures using custom container images. However, even though these container orchestration architectures allow user to utilize custom container images, these container orchestration architectures require that the custom container images be built based on base container images that are supported by these container orchestration architectures. Illustrative embodiments determine whether a custom container image built by a user is based on a correct base container image supported by the container orchestration architecture and provide quick feedback when any inconsistencies exist to prevent customer support tickets.

As an illustrative example use case, a user builds a custom container image based on a particular base container image that corresponds to operand version 12.0.3.0-r1, which is supported by the container orchestration architecture. The "FROM" line of the image file references the base container image and the "COPY" line of the image file references a new custom extension (i.e., a new layer added to the base container image. The image file may be, for example:

```
---
FROM icr.io/appc-dev/ace-
server@sha256:9c0ab33cf01233b52e1273e559c1b1daa2f23282430ecd2c48001fc
0469132f3
COPY DatabaseExample.bar/tmp
---
```

The user builds the custom container image into my-ace-image: v1 and creates a custom resource that defines an operand that references and utilizes the custom image corresponding to operand version 12.0.3.0-r1:

```
---
apiVersion: v1beta1
kind: IntegrationServer
spec:
...
pod:
containers:
runtime:
image: my-registry/my-repo/my-ace-image:v1
version: '12.0.3.0-r1'
replicas: 3
configurations: ["my-conf-1", "my-conf-2"]
---
```

Illustrative embodiments apply the custom resource to a cluster in the container orchestration architecture and trigger validation of the custom resource. Illustrative embodiments utilize an operator, which corresponds to the operand, to perform the custom resource validation. The operator analyzes the custom resource and determines whether any custom container images are specified in the custom resource. If the operator determines that no custom container images are specified in the custom resource, then custom resource validation is successful. If the operator determines that the custom container image is specified in the custom resource, then the operator inspects the layers of the custom container image and compares those layers to the layers of the base container image corresponding to the value specified in the spec.version field (i.e., 12.0.3.0-r1). For example:

```
Base container image layers:
---
sha256:e8228e50fe1805fb75cf22886a451b94982b6beea5c04ddcf24d1d2302200449
sha256:4716779a2c027017c4bb38402df4224b49f7a65264b9072ee70b2e44de85b806
sha256:b2e87d43f525940043b3ddb524c27681bbabb0df0f30d16bbe68dc6bb53772a7
...
sha256:4d6ab6d653fe05306a000f1acc9f68d1f8767d085ac0a28cfd90f829e401df06
---
Custom container image layers:
---
sha256:e8228e50fe1805fb75cf22886a451b94982b6beea5c04ddcf24d1d2302200449
sha256:4716779a2c027017c4bb38402df4224b49f7a65264b9072ee70b2e44de85b806
sha256:b2e87d43f525940043b3ddb524c27681bbabb0df0f30d16bbe68dc6bb53772a7
...
sha256:4d6ab6d653fe05306a000f1acc9f68d1f8767d085ac0a28cfd90f829e401df06
sha256:83be83893fa4121b29d6cc8f4359c1183019266c2fcb9b5211b5eb79aeaf8e13
---
```

In this example, the operator confirms that the user built the custom container image using the correct base container image based on the comparison of the layers between the base container image and the custom container image (i.e., the image layers match, except for the last newly added custom extension layer). As a result, the operator determines that validation of the custom resource is successful and persists the custom resource in a data store (e.g., etcd) of the container orchestration architecture. Further, the operator reconciles the custom resource to generate the associated operand (i.e., the cluster runtime) using the custom container image.

Subsequently, the user updates the operator to now support new operand version 12.0.4.0-r1, which has a security fix and new capability. The user wants the cluster runtimes to have the security fix and new capability. The user updates the custom resource to utilize the new operand version having the security fix and new capability. For example:

```
---
apiVersion: v1beta1
kind: IntegrationServer
spec:
...
pod:
containers:
runtime:
image: my-registry/my-repo/my-ace-image:v1
version: '12.0.4.0-r1'
replicas: 3
configurations: ["my-conf-1", "my-conf-2"]
---
```

Illustrative embodiments apply the updated custom resource to a cluster in the container orchestration architecture and trigger validation of the updated custom resource. Illustrative embodiments utilize the updated operator, which corresponds to the new operand version, to perform the updated custom resource validation. The updated operator analyzes the updated custom resource and, in this example, determines that a custom container image is specified in the updated custom resource. The updated operator then inspects the layers of the custom container image and compares those layers to the layers of the base container image corresponding to the value specified in the spec.version field (i.e., 12.0.4.0-r1). For example:

Base image layers:
```
---
sha256:f2c4302f03b8582b388fb66058da2ae3a3b70cff3ab8ce3ebfc0cc24349814b9
sha256:60609ec85f865f7d04d108c7f1366a96f15cfaad0d632f7bd0cc674b7ea7bdaa
sha256:45d15da64cef3649fc959ef1b3759c9217aabfd0a5bb42032ae924b53d3fad2a
...
sha256:e6a807b8ca41f2c7ed934b1a9c3ec0af9b8ebf0f937a73905831cddc4f4375fe
---
Custom image layers:
---
sha256:e8228e50fe1805fb75cf22886a451b94982b6beea5c04ddcf24d1d2302200449
sha256:4716779a2c027017c4bb38402df4224b49f7a65264b9072ee70b2e44de85b806
sha256:b2e87d43f525940043b3ddb524c27681bbabb0df0f30d16bbe68dc6bb53772a7
...
sha256:4d6ab6d653fe05306a000f1acc9f68d1f8767d085ac0a28cfd90f829e401df06
sha256:83be83893fa4121b29d6cc8f4359c1183019266c2fcb9b5211b5eb79aeaf8e13
---
```

In this example, the updated operator determines that the user built the custom container image using an incorrect base container image based on the comparison of the layers between the base container image corresponding to the new operand version 12.0.4.0-r1 and the custom container image (i.e., the image layers do not match). As a result, the updated operator sends a notification of the error to the user for the user to make an appropriate correction. The notification can state, for example, "The custom container image specified is not using the correct base container image for the requested new operand version 12.0.4.0-r1. Please rebuild your custom container image based on the 12.0.4.0-r1 base container image." In response to receiving the notification, the user rebuilds the custom container image from the correct base container image as my-ace-image: v2. For example:

```
---
FROM icr.io/appc-dev/ace-
server@sha256:6ddc1cbb3437b4a0d75a5a2c6f7210656d2195d28faa0ab6f6ca4ef
4f59d973c
COPY DatabaseExample.bar /tmp
---
```

In addition, the user updates the custom resource to utilize the new custom container image:

```
---
apiVersion: v1beta1
kind: IntegrationServer
spec:
...
pod:
containers:
```

*-continued*

```
runtime:
image: my-registry/my-repo/my-ace-image:v2
version: '12.0.4.0-r1'
replicas: 3
configurations: ["my-conf-1", "my-conf-2"]
```

Illustrative embodiments apply the newly updated custom resource to the cluster in the container orchestration architecture and trigger validation of the newly updated custom resource. Illustrative embodiments utilize the updated operator, which corresponds to the new operand version, to perform the newly updated custom resource validation. The updated operator analyzes the newly updated custom resource and, in this example, determines that a custom container image is specified in the newly updated custom resource. The updated operator then inspects the layers of the custom container image and compares those layers to the layers of the base container image corresponding to the value specified in the spec.version field (i.e., 12.0.4.0-r1). For example:

```
Base image layers:
---
sha256:f2c4302f03b8582b388fb66058da2ae3a3b70cff3ab8ce3ebfc0cc24349814b9
sha256:60609ec85f865f7d04d108c7f1366a96f15cfaad0d632f7bd0cc674b7ea7bdaa
sha256:45d15da64cef3649fc959ef1b3759c9217aabfd0a5bb42032ae924b53d3fad2a
...
sha256:e6a807b8ca41f2c7ed934b1a9c3ec0af9b8ebf0f937a73905831cddc4f4375fe
---
Custom image layers:
---
sha256:f2c4302f03b8582b388fb66058da2ae3a3b70cff3ab8ce3ebfc0cc24349814b9
sha256:60609ec85f865f7d04d108c7f1366a96f15cfaad0d632f7bd0cc674b7ea7bdaa
sha256:45d15da64cef3649fc959ef1b3759c9217aabfd0a5bb42032ae924b53d3fad2a
...
```

-continued sha256:e6a807b8ca41f2c7ed934bla9c3ec0af9b8ebf0f937a73905831cddc4f4375fe
sha256:83be83893fa4121b29d6cc8f4359c1183019266c2fcb9b5211b5eb79aeaf8e13
---

In this example, the updated operator now determines that the user built the custom container image using the correct base container image based on the comparison of the layers between the base container image corresponding to the new operand version 12.0.4.0-r1 and the custom container image (i.e., the image layers now match, except for the newly added custom extension layer). As a result, the updated operator determines that validation of the newly updated custom resource is successful and persists the newly updated custom resource in the data store of the container orchestration architecture. Further, the updated operator reconciles the newly updated custom resource to generate the associated operand (i.e., the cluster runtime) using the custom container image.

Thus, without utilizing illustrative embodiments, a user can incorrectly create an Integration Server operand using a custom container image that would be running unsupported in the container orchestration architecture. When an error subsequently occurs, the user opens a customer support ticket causing lots of time and effort to be expended, which illustrative embodiments could have prevented. Additionally, when a user wants to move to a new version of the operator, illustrative embodiments can trigger automated dependency checks to determine whether a newer version of corresponding operands is available and submit a pull request to a version control system to automatically change the respective image file to use the new container image as a base and trigger an associated Continuous Integration/Continuous Deployment pipeline. Thus, illustrative embodiments ensure that custom container images are built from an appropriate base container image supported by a particular container orchestration architecture.

Thus, illustrative embodiments provide one or more technical solutions that overcome a technical problem with an inability of current solutions to detect when a user builds a custom container image for a particular container orchestration architecture based on an incorrect base container image. As a result, these one or more technical solutions provide a technical effect and practical application in the field of container orchestration architectures.

Figure 2:
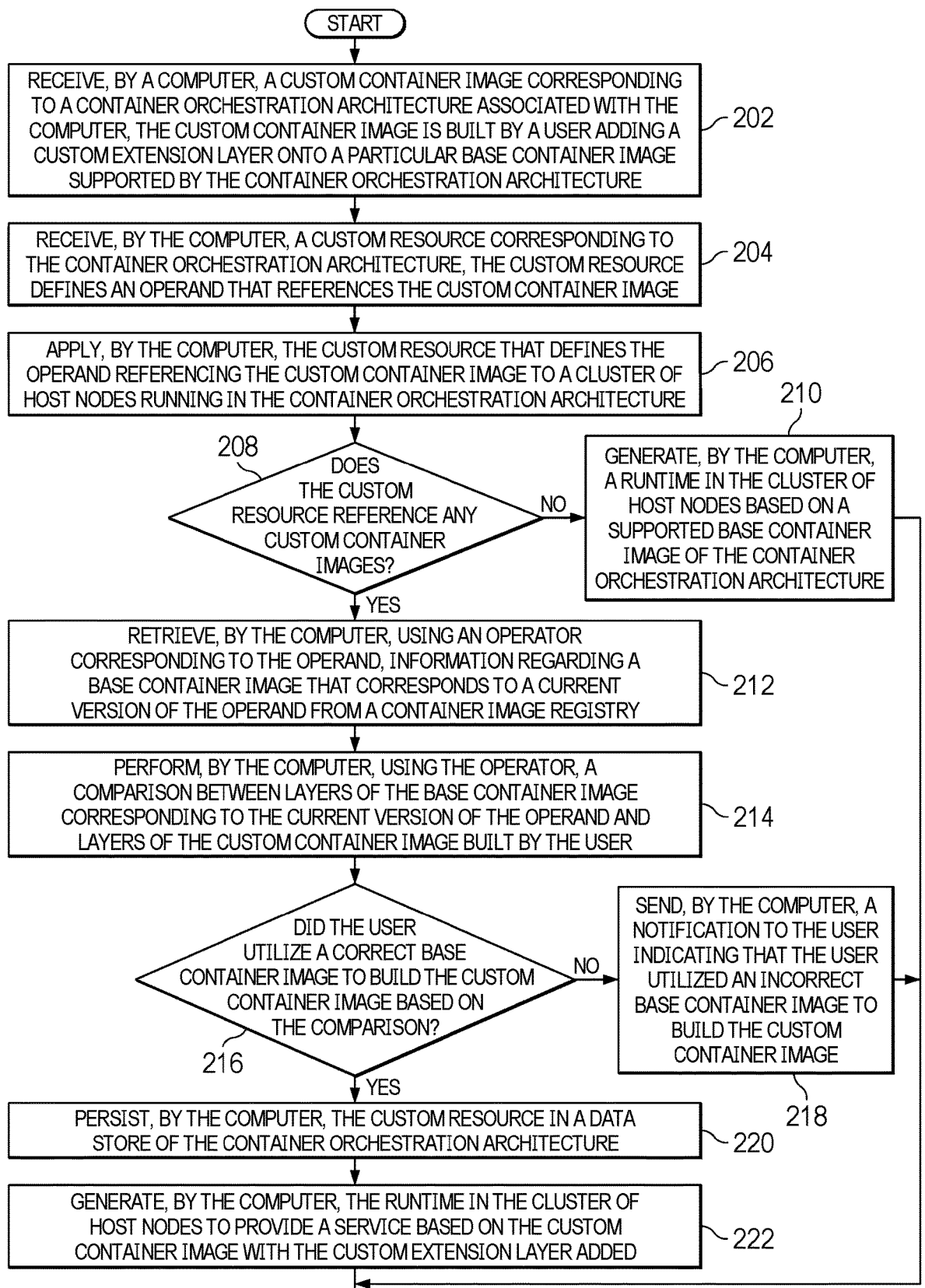
FIG. 2 is a flowchart illustrating a process for determining correct base container images to support custom container images in accordance with an illustrative embodiment.

With reference now to FIG. 2, a flowchart illustrating a process for determining correct base container images to support custom container images is shown in accordance with an illustrative embodiment. The process shown in FIG. 2 may be implemented in a computer, such as, for example, computer 101 in FIG. 1. For example, the process shown in FIG. 2 may be implemented in correct base container image determination code 200 in FIG. 1.

The process begins when the computer receives a custom container image corresponding to a container orchestration architecture associated with the computer (step 202). The custom container image is built by a user adding a custom extension layer onto a particular base container image supported by the container orchestration architecture. In addition, the computer receives a custom resource corresponding to the container orchestration architecture (step 204). The custom resource defines an operand that references the custom container image. Further, the computer applies the custom resource that defines the operand referencing the custom container image to a cluster of host nodes running in the container orchestration architecture (step 206).

The computer makes a determination as to whether the custom resource references any custom container images (step 208). If the computer determines that the custom resource does not reference any custom container images, no output of step 208, then the computer generates a runtime in the cluster of host nodes based on a supported base container image of the container orchestration architecture (step 210). Thereafter, the process terminates. If the computer determines that the custom resource does reference the custom container image, yes output of step 208, then the computer, using an operator corresponding to the operand, retrieves information regarding a base container image that corresponds to a current version of the operand from a container image registry (step 212). The information regarding the base container image may be, for example, properties, metadata, or the like of the base container image. Alternatively, the operator can retrieve the base contain image, itself.

The computer, using the operator, performs a comparison between layers of the base container image corresponding to the current version of the operand and layers of the custom container image built by the user (step 214). Afterward, the computer makes a determination as to whether the user utilized a correct base container image to build the custom container image based on the comparison between the layers of the base container image corresponding to the current version of the operand and the layers of the custom container image built by the user (step 216).

If the computer determines that the user did not utilize the correct base container image to build the custom container image based on the comparison between the layers of the base container image corresponding to the current version of the operand and the layers of the custom container image built by the user (i.e., the image layers did not match), no output of step 216, then the computer sends a notification to the user indicating that the user utilized an incorrect base container image to build the custom container image (step 218). Thereafter, the process terminates. If the computer determines that the user did utilize the correct base container image to build the custom container image based on the comparison between the layers of the base container image corresponding to the current version of the operand and the layers of the custom container image built by the user (i.e., the image layers matched), yes output of step 216, then the computer persists the custom resource in a data store of the container orchestration architecture (step 220). Furthermore, the computer generates the runtime in the cluster of host nodes to provide a service based on the custom container image with the custom extension layer added (step 222). Thereafter, the process terminates.

Thus, illustrative embodiments of the present disclosure provide a computer-implemented method, computer system, and computer program product for ensuring that referenced or deployed custom container images are valid in their usage by comparing the layers of the custom container images with supported base container images of the container orchestration environment. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for determining correct base container images to support custom container images, the computer-implemented method comprising:
performing, by a computer, using an operator, a comparison between layers of a base container image corresponding to a current version of an operand and layers of a custom container image built by a user;
determining, by the computer, whether the user utilized a correct base container image to build the custom container image based on the comparison between the layers of the base container image corresponding to the current version of the operand and the layers of the custom container image built by the user; and
generating, by the computer, a runtime in a cluster of host nodes to provide a service based on the custom container image in response to the computer determining that the user utilized the correct base container image to build the custom container image based on the comparison between the layers of the base container image corresponding to the current version of the operand and the layers of the custom container image built by the user.

2. The computer-implemented method of claim 1, further comprising:
sending, by the computer, a notification to the user indicating that the user utilized an incorrect base container image to build the custom container image in response to the computer determining that the user did not utilize the correct base container image to build the custom container image based on the comparison between the layers of the base container image corresponding to the current version of the operand and the layers of the custom container image built by the user.

3. The computer-implemented method of claim 1, further comprising:
receiving, by the computer, the custom container image corresponding to a container orchestration architecture associated with the computer, wherein the custom container image is built by the user adding a custom extension layer onto a particular base container image supported by the container orchestration architecture.

4. The computer-implemented method of claim 3, further comprising:
receiving, by the computer, a custom resource corresponding to the container orchestration architecture, wherein the custom resource defines the operand that references the custom container image; and
applying, by the computer, the custom resource that defines the operand referencing the custom container image to the cluster of host nodes running in the container orchestration architecture.

5. The computer-implemented method of claim 4, further comprising:
determining, by the computer, whether the custom resource references any custom container images; and
retrieving, by the computer, using the operator corresponding to the operand, information regarding the base container image that corresponds to the current version of the operand from a container image registry in response to the computer determining that the custom resource does reference the custom container image.

6. The computer-implemented method of claim 5, further comprising:
generating, by the computer, the runtime in the cluster of host nodes based on a supported base container image of the container orchestration architecture in response to the computer determining that the custom resource does not reference any custom container images.

7. The computer-implemented method of claim 4, further comprising:
persisting, by the computer, the custom resource in a data store of the container orchestration architecture in response to the computer determining that the user utilized the correct base container image to build the custom container image based on the comparison between the layers of the base container image corresponding to the current version of the operand and the layers of the custom container image built by the user.

8. The computer-implemented method of claim 1, wherein the computer determines whether each respective custom container image on the cluster of host nodes in a container orchestration architecture are based on a correct common base container image to enforce application security compliance requirements.

9. A computer system for determining correct base container images to support custom container images, the computer system comprising:
a communication fabric;
a storage device connected to the communication fabric, wherein the storage device stores program instructions; and
a processor connected to the communication fabric, wherein the processor executes the program instructions to:
perform, using an operator, a comparison between layers of a base container image corresponding to a current version of an operand and layers of a custom container image built by a user;
determine whether the user utilized a correct base container image to build the custom container image based on the comparison between the layers of the base container image corresponding to the current version of the operand and the layers of the custom container image built by the user; and
generate a runtime in a cluster of host nodes to provide a service based on the custom container image in response to determining that the user utilized the correct base container image to build the custom container image based on the comparison between the layers of the base container image corresponding to the current version of the operand and the layers of the custom container image built by the user.

10. The computer system of claim 9, wherein the processor further executes the program instructions to:
send a notification to the user indicating that the user utilized an incorrect base container image to build the custom container image in response to determining that the user did not utilize the correct base container image to build the custom container image based on the comparison between the layers of the base container image corresponding to the current version of the operand and the layers of the custom container image built by the user.

11. The computer system of claim 9, wherein the processor further executes the program instructions to:
receive the custom container image corresponding to a container orchestration architecture associated with the computer system, wherein the custom container image is built by the user adding a custom extension layer onto a particular base container image supported by the container orchestration architecture.

12. The computer system of claim 11, wherein the processor further executes the program instructions to:
receive a custom resource corresponding to the container orchestration architecture, wherein the custom resource defines the operand that references the custom container image; and
apply the custom resource that defines the operand referencing the custom container image to the cluster of host nodes running in the container orchestration architecture.

13. The computer system of claim 12, wherein the processor further executes the program instructions to:
determine whether the custom resource references any custom container images; and
retrieve, using the operator corresponding to the operand, information regarding the base container image that corresponds to the current version of the operand from a container image registry in response to determining that the custom resource does reference the custom container image.

14. The computer system of claim 13, wherein the processor further executes the program instructions to:
generate the runtime in the cluster of host nodes based on a supported base container image of the container orchestration architecture in response to determining that the custom resource does not reference any custom container images.

15. A computer program product for determining correct base container images to support custom container images, the computer program product comprising a computer-readable storage medium having program instructions embodied therewith, the program instructions executable by a computer to cause the computer to:
perform, using an operator, a comparison between layers of a base container image corresponding to a current version of an operand and layers of a custom container image built by a user;
determine whether the user utilized a correct base container image to build the custom container image based on the comparison between the layers of the base container image corresponding to the current version of the operand and the layers of the custom container image built by the user; and
generate a runtime in a cluster of host nodes to provide a service based on the custom container image in response to determining that the user utilized the correct base container image to build the custom container image based on the comparison between the layers of the base container image corresponding to the current version of the operand and the layers of the custom container image built by the user.

16. The computer program product of claim 15, wherein the program instructions further cause the computer to:
send a notification to the user indicating that the user utilized an incorrect base container image to build the custom container image in response to determining that the user did not utilize the correct base container image to build the custom container image based on the comparison between the layers of the base container image corresponding to the current version of the operand and the layers of the custom container image built by the user.

17. The computer program product of claim 15, wherein the program instructions further cause the computer to:
receive the custom container image corresponding to a container orchestration architecture associated with the computer, wherein the custom container image is built by the user adding a custom extension layer onto a particular base container image supported by the container orchestration architecture.

18. The computer program product of claim 17, wherein the program instructions further cause the computer to:
receive a custom resource corresponding to the container orchestration architecture, wherein the custom resource defines the operand that references the custom container image; and
apply the custom resource that defines the operand referencing the custom container image to the cluster of host nodes running in the container orchestration architecture.

19. The computer program product of claim 18, wherein the program instructions further cause the computer to:
determine whether the custom resource references any custom container images; and
retrieve, using the operator corresponding to the operand, information regarding the base container image that corresponds to the current version of the operand from a container image registry in response to determining that the custom resource does reference the custom container image.

20. The computer program product of claim 19, wherein the program instructions further cause the computer to:
generate the runtime in the cluster of host nodes based on a supported base container image of the container orchestration architecture in response to determining that the custom resource does not reference any custom container images.

* * * * *